US009424137B1

(12) United States Patent
Mam

(10) Patent No.: US 9,424,137 B1
(45) Date of Patent: Aug. 23, 2016

(54) BLOCK-LEVEL BACKUP OF SELECTED FILES

(71) Applicant: EMC Corporation, Hopkinton, MA (US)

(72) Inventor: Neelabh Mam, Bangalore (IN)

(73) Assignee: EMC CORPORATION, Hopkinton, MA (US)

( * ) Notice: Subject to any disclaimer, the term of this patent is extended or adjusted under 35 U.S.C. 154(b) by 242 days.

(21) Appl. No.: 14/039,173

(22) Filed: Sep. 27, 2013

(51) Int. Cl.
G06F 17/00 (2006.01)
G06F 11/14 (2006.01)

(52) U.S. Cl.
CPC .................... *G06F 11/1451* (2013.01)

(58) Field of Classification Search
CPC ............ G06F 2201/84; G06F 11/1451; G06F 11/1469; G06F 11/1448; G06F 17/30174; G06F 3/065; G06F 11/1446; G06F 2201/815; G06F 11/1453
See application file for complete search history.

(56) References Cited

U.S. PATENT DOCUMENTS

| 6,745,324 B1* | 6/2004 | Skazinski ................. G06F 8/60 713/2 |
| 7,103,619 B1* | 9/2006 | Rajpurkar ......... G06F 17/30578 |
| 2005/0216788 A1* | 9/2005 | Mani-Meitav ...... G06F 11/1456 714/6.32 |
| 2007/0143563 A1* | 6/2007 | Pudipeddi ............. G06F 3/0607 711/173 |
| 2007/0174569 A1* | 7/2007 | Schnapp ............... G06F 3/0604 711/162 |
| 2008/0104355 A1* | 5/2008 | Moore .................. G06F 3/0607 711/170 |
| 2010/0235831 A1* | 9/2010 | Dittmer ............... G06F 9/45558 718/1 |

* cited by examiner

Primary Examiner — Angelica Ruiz
(74) Attorney, Agent, or Firm — Polsinelli PC

(57) ABSTRACT

A block-level backup of a selected file on a source volume is done in an efficient manner by taking a snapshot copy of the source volume, and creating, mounting, and formatting a dynamically-extended backup volume, creating a sparse backup file on the backup volume, and then consolidating extents of the selected file while copying the extents at the block level from the snapshot copy of the source volume to the backup file on the backup volume. For an incremental block backup, only extents of changed blocks of the selected file are copied, and the changed blocks are identified by a modified block map of a previous snapshot copy of the source volume.

20 Claims, 5 Drawing Sheets

BLOCK-LEVEL BACKUP OF SELECTED FILES

FIELD OF THE INVENTION

The various embodiments described herein relate generally to block-level backup of selected files, and in particular to a way of reducing the time for backing up selected files to produce a backup volume in a dynamic volume container.

BACKGROUND

In today's computing environments, it is often desirable to backup computer data by copying and archiving the data (e.g., creating a backup image) so that the data may be restored after a data loss event (e.g., hardware failure, etc.). There are at least two types of backup applications that are implemented in this regard. File-level backup applications copy data from a source location to a backup location on a file-by-file basis regardless of where the data of the file is physically stored. This means that the backup application attempts to build and replicate the original file by reading the logical file system present on the original location. The granularity of the resulting backup entities for file-level backups is therefore individual files. Block-level backup applications, on the other hand, bypass the file system and perform backups of entire volumes of data from the original location.

One advantage of bypassing the file system for a block-level backup is that there is no penalty in performance in cases where the original location contains large numbers of files (such performance impacts may take place if file-level backup were to be used). As a result of bypassing the file system, the granularity of the resulting backup entity for block-level backups is therefore the entire volume's image (i.e., binary image). Another advantage of bypassing the file system is that for certain storage volumes, a file-level backup will not capture all of the data of interest on the storage volume. For example, file-level backup may not capture data from proprietary data structures that are not contained in files of a file system built and exposed on the storage volume. Such data structures are found, for example, in various Microsoft WINDOWS™ brand operating systems and Microsoft EXCHANGE™ brand e-mail systems.

A way of block-level backup is to make and archive a full backup of a source volume on a periodic basis, and to make and archive an incremental backup of the source volume on a more frequent basis. A differential backup is another name for an incremental backup. For example, a full backup is made on a weekly basis, at 2:00 a.m. on Sunday, and an incremental backup is otherwise made on a daily basis, at 2:00 a.m. on Monday, Tuesday, Wednesday, Thursday, Friday, and Saturday. Each incremental backup includes only the blocks of data that have changed in the source volume since the previous backup. Each incremental backup also identifies all of the changed blocks. The incremental backup includes a changed block map that identifies the changed blocks, and the changed block map is a block bitmap or an extent map. A block bitmap includes a bit for each block of the source volume, and a bit set to indicate that a corresponding block of data that has changed in the source volume since the previous backup. An extent map includes entries for extents of contiguous blocks of data that have changed in the source volume since the previous backup. For example, each extent entry includes an offset and length for a corresponding extent, and the extent entries are arranged in a list sorted by offset.

A conventional way of restoring a source volume to the time of a selected incremental backup involves copying blocks to the source volume from the most recent full backup made before the time of the selected incremental backup, and then copying blocks to the source volume from any and all incremental backups that were made between the time of this full backup and the selected incremental backup, and then copying blocks to the source volume from the selected incremental backup. These backups are copied successively to the source volume in chronological order of the backups, beginning with a full restoration of the source volume with the full incremental backup, and ending with the copying of blocks from the selected incremental backup to the source volume.

BRIEF DESCRIPTION OF THE DRAWINGS

Various embodiments in accordance with the present disclosure will be described with reference to the drawings, in which.

DETAILED DESCRIPTION

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Although the process flows shown in the figures or contained in following description may depict functional operations in a particular sequence, the processes are not necessarily limited to the particular order or operations illustrated. One skilled in the art will appreciate that the various operations portrayed in the figures can be changed, rearranged, performed in parallel or adapted in various ways. Furthermore, it is to be understood that certain operations or sequences of operations can be added to or omitted from the processes, without departing from the scope of the various embodiments. In addition, the process illustrations contained herein are intended to demonstrate an idea of the process flow to one of ordinary skill in the art, rather than specifying the actual sequences of code execution, which may be implemented as different flows or sequences, optimized for performance, or otherwise modified in various ways.

Figure 1:
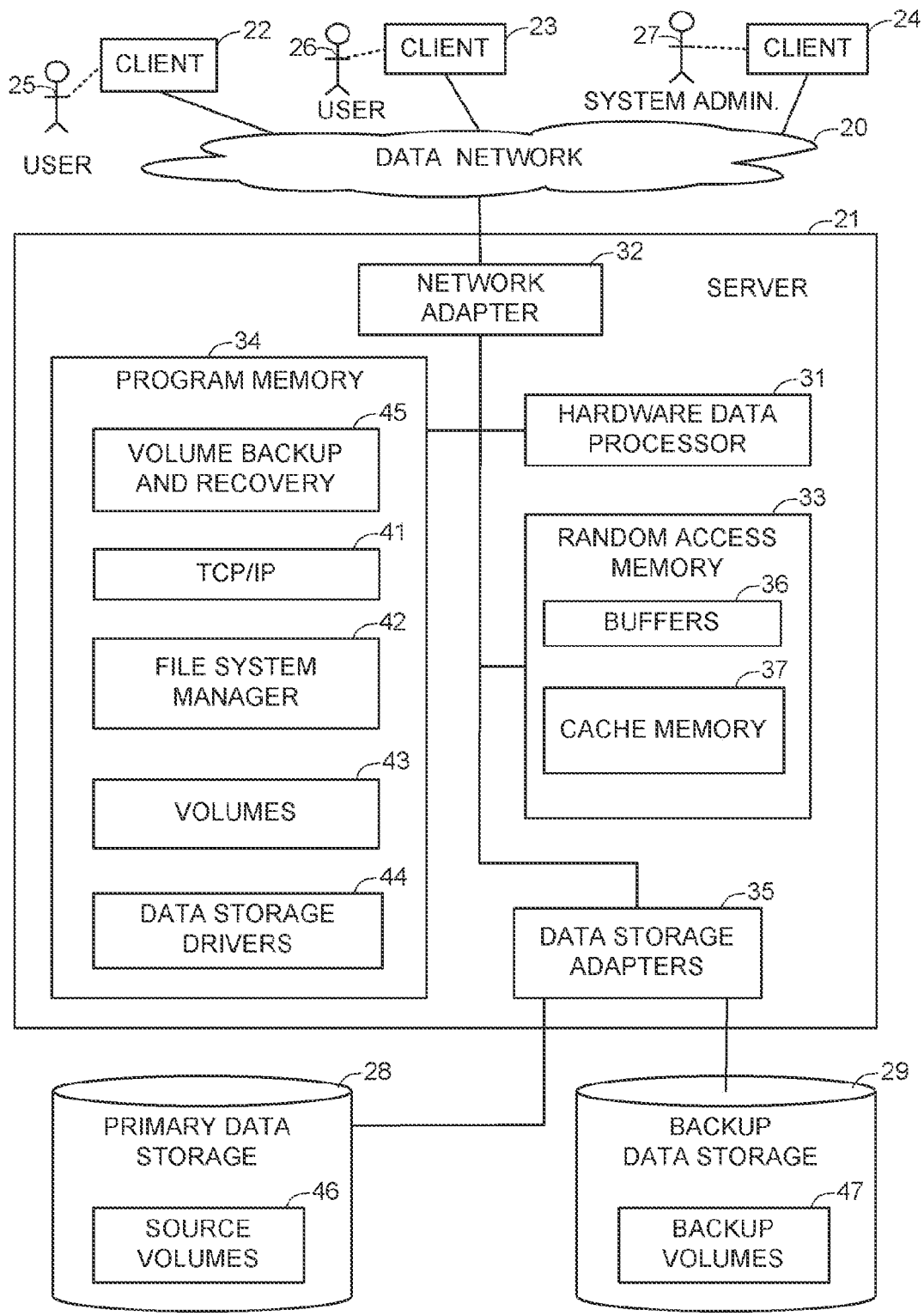
FIG. 1 illustrates a data network including a server providing clients with access to data storage.

FIG. 1 shows a data network 20 including a server 21 for servicing requests from network clients 22, 23, 24 for access to source volumes 46 in primary data storage 28. The network clients 22, 23, 24, for example, are workstations operated by respective human users 25, 26, 27. The primary data storage 28, for example, is an array of disk drives. The server 31 also has access to backup data storage 29 storing backup volumes 47 of data from the source volumes 46. The backup data storage 29 may use the same kind of data storage devices as the primary data storage 28, or the backup data storage 29 may use data storage devices that are slower and less expensive than the data storage devices used for the primary data storage 28.

The server 21 includes a hardware data processor 31, a network adapter 32 linking the data processor to the data network 20, random access memory 33, program memory 34, and data storage adapters 35 linking the data processor to the primary data storage 28 and the backup data storage 29. The data storage adapters 35, for example, are Fibre-Channel (FC), Small Computer Systems Interface (SCSI), or Internet Protocol SCSI (iSCSI) host bus adapters. The data processor 31 is a general purpose digital computer data processor including one or more core central processing units (CPUs) for executing computer program instructions stored in the program memory 34. The program memory 34 is a non-transitory computer readable storage medium, such as a local magnetic hard disk drive, or electrically erasable and programmable read-only memory (EEPROM). The random access memory 33 includes buffers 36, and cache memory 37 for paging data from the primary data storage 28 or the backup data storage 29.

The program memory 34 includes a program layer 41 for network communication using the Transmission Control Protocol (TCP) and the Internet Protocol (IP). The program memory 34 also includes a file system manager 42 for responding to client requests for access to files in file systems, and a logical volumes layer 43 providing access to logical volumes upon which the file systems are built. The logical volumes include the source volumes 46 and the backup volumes 47. For example, each logical volume is configured from one or more logical unit numbers (LUNs) of either the primary data storage data storage 28 or the backup data storage 29, and the logical volumes layer 43 translates logical block numbers from the file system manager 42 to the LUNs where the desired blocks of storage are found.

The various embodiments described herein relate generally to volume backup and recovery programs 45 executed by the data processor 31 to produce the backup volumes 47 from data of the source volumes 46, and to restore a selected source volume to the time of a selected one of the backup volumes that was produced from data of the source volume.

Figure 2:
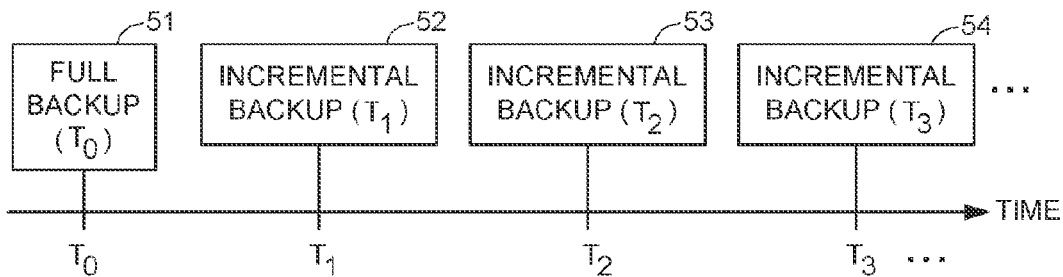
FIG. 2 illustrates a backup schedule including a full backup followed by a chronological series of incremental backups.

FIG. 2 illustrates a backup schedule producing a chronological series of backups of a source volume. The backups include a full backup 51 a time $T_0$ followed by incremental backups 52, 53, 54 at respective times $T_1$, $T_2$, $T_3$, etc. Once a backup volume is made on the backup data storage, an archive copy of the backup volume may be stored on magnetic tape or optical disk. After a certain period of time, the backup volume may be deleted from the backup data storage 29.

Figure 3:
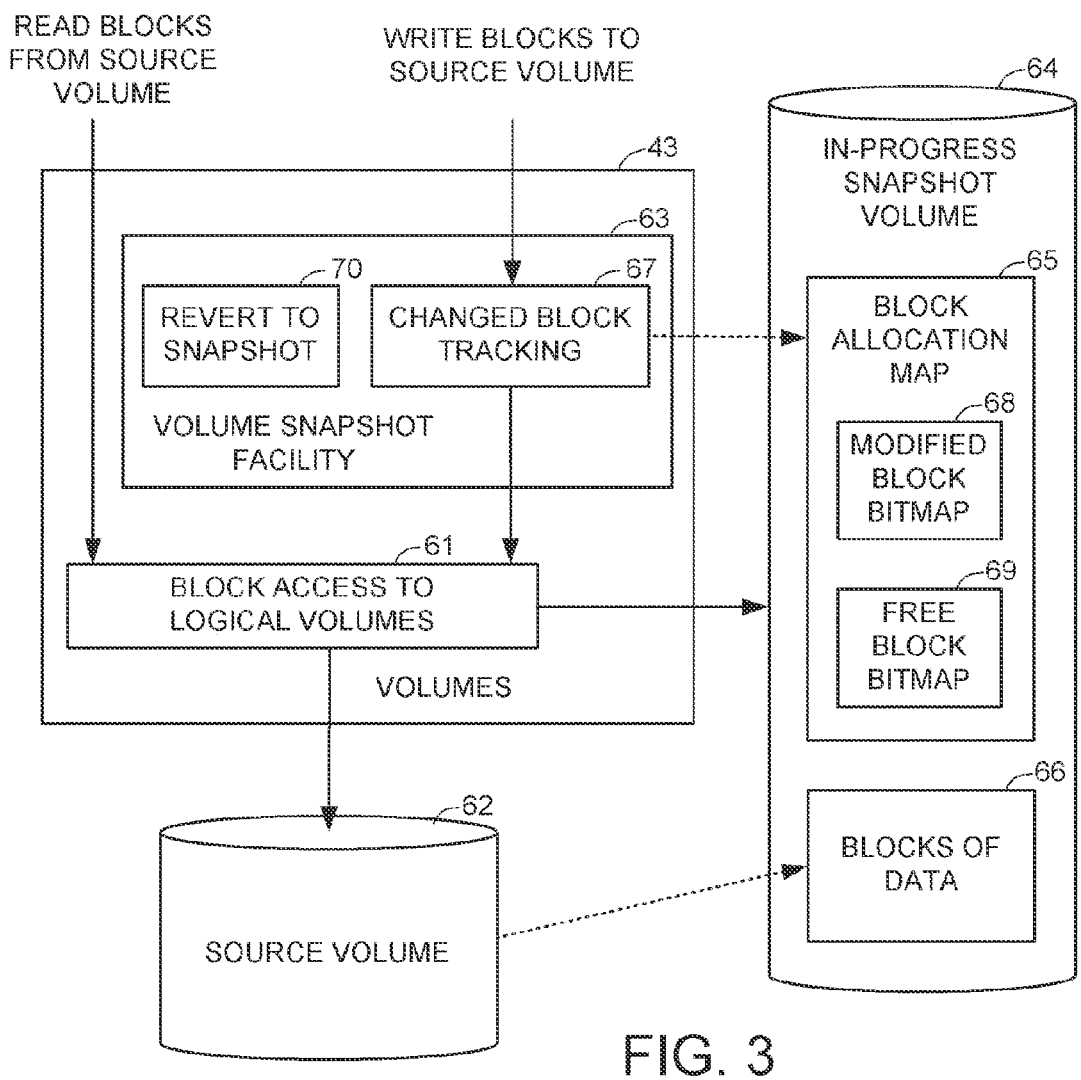
FIG. 3 illustrates a volume snapshot facility producing a snapshot volume from a source volume.

FIG. 3 shows a volume snapshot facility 63 producing a snapshot volume 64 from a source volume 62. The volume snapshot facility 63 operates at the volume level of the logical volumes facility 43 to intercept volume write requests from higher levels. Upon intercepting such a write request directed to a specified block of the source volume 62, a changed block tracking driver 67 accesses a block allocation map 65 in the snapshot volume 64 to determine whether or not the specified block has been changed since the time that the snapshot process began upon the snapshot volume 64. For example, the block allocation map 65 includes a modified block bitmap 68 in which a respective bit for each block is either a logical zero indicating that the block has not been changed since the time of the snapshot, or else is a logical 1 indicating that the block has been changed since the time of the snapshot.

If the block allocation map 65 indicates that the block has been changed since the time of the snapshot, then the write request is passed to the block access routine 61 of the logical volumes facility 43, and new data is written to the specified data block in the normal fashion. Otherwise, if the block allocation map 65 indicates that the block has not changed since the time of the snapshot, then the volume snapshot facility 63 performs a "copy upon first write" by copying the "before image" of the specified block from the source volume 62 to the snapshot volume 64. Once this copy operation has been completed, the volume snapshot facility sends the new data for the specified block down to the block access routine 61, and this new data is written to the specified block of the source volume 62.

For example, the snapshot volume 64 includes a block data region 66 for storing "before image" block data, and a free block bitmap 69 for storing "before image" block metadata about the block allocation state. The snapshot volume 64 may conform to the Microsoft Virtual Hard Disk Image Specification (Oct. 11, 2006—Version 1.0). In this case, "a copy upon first write" upon a specified block includes checking the allocation state of the specified block in the source volume, and if the allocation state in the source volume indicates that the specified block is free, then the "copy upon first write" is finished because the free block bit map 69 has an initial state, at the start of the snapshot process, indicating that all blocks of the snapshot volume 64 are free. Otherwise, if the allocation state in the source volume indicates that the specified block is allocated, then a data block in the region 66 is allocated, the corresponding bit in the free block bitmap 69 is set, and the data of the corresponding block is copied from the source volume 62 to the allocated data block in the region 66.

To make full and incremental backups from the source volume 62, a series of at least two snapshot volumes are kept during client access to the source volume 62. For example, to make a backup copy at a present time $T_B$, a snapshot process in progress at this time $T_B$ is terminated upon an old snapshot volume ($T_{B-1}$), and a snapshot process is begun upon a new snapshot volume ($T_B$). Then, after the time $T_B$, a full backup volume ($T_B$) is created by copying the "before image" blocks from the new snapshot volume ($T_B$) to a backup volume, or else copying the blocks (which have not changed since $T_B$) from the source volume 22, so that the full backup includes a copy of every allocated block that was in the source volume 62 at the time $T_B$.

After the time $T_B$, an incremental backup volume ($T_B$) is created in the same way that the full backup volume ($T_B$) except that the incremental backup volume only includes block data or metadata for the blocks indicated as modified by the modified bitmap from the snapshot volume ($T_{B-1}$). For example, the incremental backup volume ($T_B$) has the same modified bitmap as the snapshot volume ($T_{B-1}$). Thus, the old snapshot volume ($T_{B-1}$) can be converted to an incremental backup volume ($T_B$) by replacing the old block metadata and old block data in the old snapshot volume with new block metadata and new block data from the new snapshot volume or else from the source volume. A full or incremental backup volume may also conform to the Microsoft Corp. Virtual Hard Disk Image Specification (Oct. 11, 2006—Version 1.0).

The volume snapshot facility 63 may also have a "revert to snapshot" function 70 for restoring the source volume to the "in progress" snapshot copy. Such a "revert to snapshot" function scans the modified block bitmap 68 to restore the modified blocks of the source volume with the block data and metadata from the block data region 68 and the free block bitmap 69. For example, such a "revert to snapshot" function is included in the Microsoft Corp. Volume Shadow Copy Service (VSS).

The various embodiments disclosed herein relate to block-level backup of one or more selected files from a source volume to produce a backup volume containing backup copies of the selected files in a dynamic volume. Under certain circumstances and in certain data processing environments, such a backup method may enjoy the benefits of both file-level backup and block-level backup and these benefits will outweigh the relative disadvantages of both file-level backup and block-level backup. For example, such a backup method may be advantageous in circumstances and environments where the conventional block-level volume backup method would be desirable yet the conventional block-level volume backup method would be precluded by a need to desire to avoid a full backup of all of the data or metadata on the source volume. In particular, the conventional block-level volume backup method may be desirable because the source volume is rather densely populated with file data that would be fragmented due to a rather large number of relatively small files or due to fragmented files. Yet there may be a need to avoid a full backup of all of the data or metadata on the source volume due to software licensing restrictions precluding backup copies. There may also be a desire to avoid copying files or volume data or metadata that would not be needed from backup storage during a recovery operation. However, a block-level backup of only selected files should be done efficiently in order to be competitive with a conventional block-level backup that does not spend processing time identifying specific files on a source volume.

One specific situation where the backup method disclosed herein is advantageous is a virtual machine environment where a number of users or user groups may share a host computer or a server so that it would be desirable to provide a separate backup of the virtual machine configuration and files for each user or user group in a separate portable dynamic volume. A similar situation is an e-mail server in which it would be desirable to provide a separate backup of the e-mail for each user or user group in a separate portable dynamic volume. Such a portable dynamic volume could be used not only for recovery in the case of a host computer or server failure or loss due to a disaster, but also for migration of a user to another host computer or server.

Storing the backup in a dynamic volume provides a convenient way of using existing operating system and application facilities for transporting, archiving, searching, and mounting of the dynamic backup volume so that the files in the dynamic backup volume can be easily exposed and accessed when needed. The dynamic backup volume may be simply a sparse file in which the dynamic backup volume consists of the extent of the file. See, for example, Virendra Mane U.S. Patent Application Publication US 2007/0136548 A1 published Jun. 14, 2007, incorporated herein by reference. Alternatively, the dynamic backup volume may be contained in a more complex container. For example, the dynamic backup volume container may be partitioned into more than one dynamic volume and may contain metadata about the various partitions, such as a starting offset for each partition. For example, the dynamic backup volume container may represent a virtual hard disk. In particular, the dynamic backup volume container may be compliant with the Microsoft Corp. Virtual Hard Disk Image Specification (Oct. 11, 2006—Version 1.0).

Figure 4:
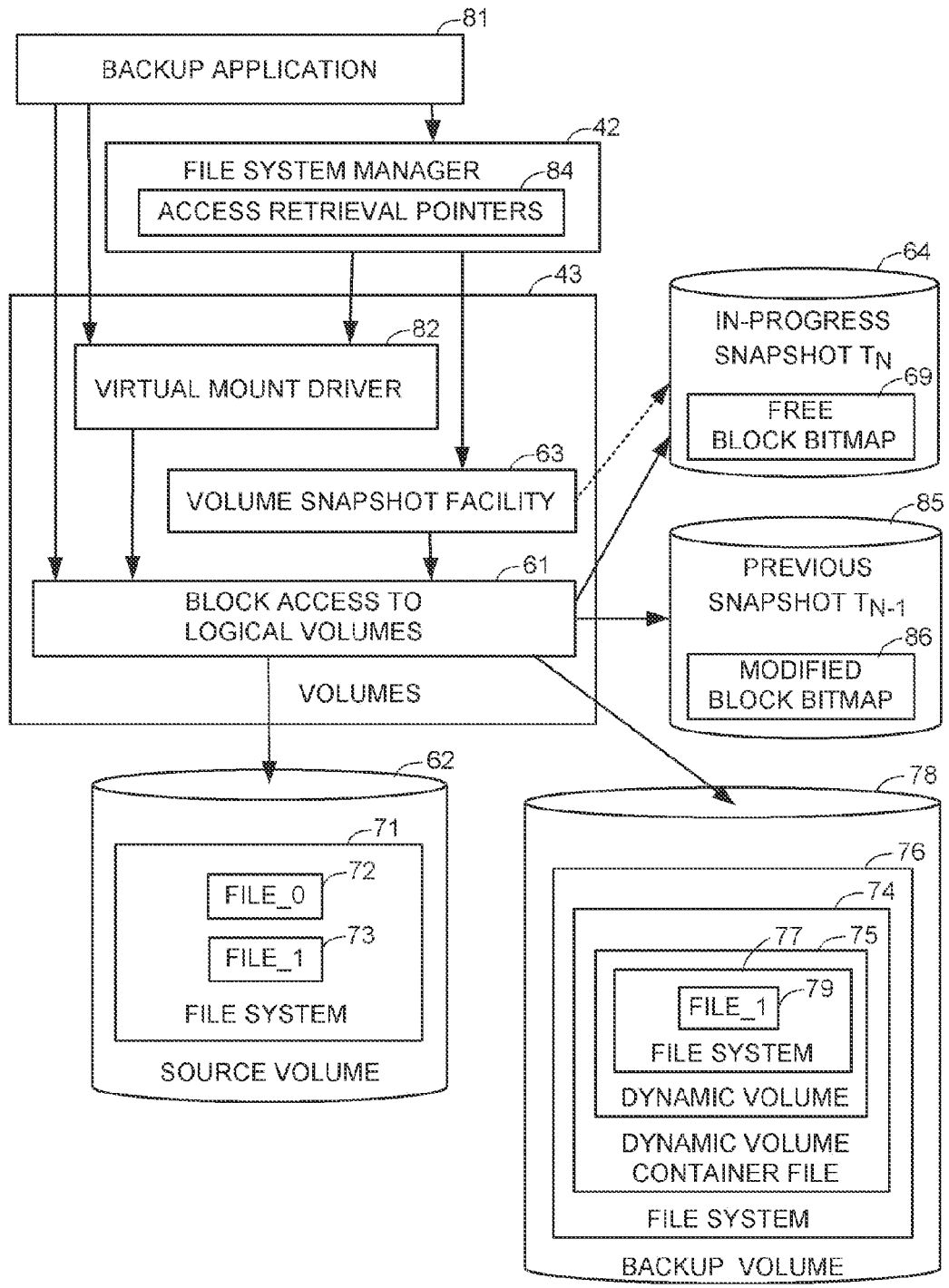
FIG. 4 illustrates a backup application performing block-level backup of a selected file to produce a backup volume in a dynamic volume container.

FIG. 4, for example, shows that a file system 71 is built on the source volume 62, and the file system includes at least two files 72, 73. In this example, a block-level backup is made that excludes the file 72 and includes the file 73. The backup is contained in a dynamic volume container file 74. The extent of the dynamic volume container file 74 contains a dynamic volume 75. A file system 77 is built on the dynamic volume 75. The dynamic volume container file 74 is a file of a file system 76 built on a backup volume 78.

To create the dynamic volume container file 74, a backup application 81 invokes a virtual mount driver 84 for the particular format of the dynamic volume container file 74. To create a full block-level backup of the file 73 on the source volume 62, the data blocks of the file 73 in the snapshot 64 of the source volume 82 at the time $T_N$ are copied to a sparse backup file 79 in the file system 77 on the dynamic volume 75. Extents of the selected file 73 are consolidated while the extents are copied at the block level from in-progress snapshot 64 of the source volume to the backup file 79 on the dynamic volume 75.

Although the copying of the blocks of the file 73 could be done at the level of operating system writes by opening the file 78, reading blocks of the file 73 from the in-progress snapshot 84, and writing the blocks to the backup file 79, a preferred way of copying the blocks is to invoke the "access retrieval pointers" function 84 of the file system manager 42 to obtain the extents of contiguous blocks of the file 73, and then fetch the data blocks of these extents from the volume snapshot copy facility 53 for the snapshot 64, and then write these blocks at the logical block level to the dynamic volume 75 by invoking the virtual mount driver 82. In this case, the offset of each extent on the dynamic volume 75 is the offset of each extent in the file 73 in the snapshot 64 plus a constant. This constant is the logical block number where the logical extent of the file 79 begins on the dynamic volume 75. In other words, the file 79 is not fragmented on the dynamic volume 75. When writing the data blocks to the file 79 at the logical block level of the dynamic volume 75, there is a linear translation between the logical extent of the file 79 and a corresponding extent of contiguous logical blocks of the dynamic volume 75. This linear translation when writing the data blocks at the logical block level to the dynamic volume 75 eliminates processing time that would otherwise be required for accessing file mapping metadata of the file 79. This linear translation when writing the data blocks at the logical block level also avoids any side effects that could result from opening and closing of the file 79.

To create an incremental block-level backup of the file 73 on the dynamic volume 75, only changed blocks of the file 73 in the snapshot 64 at the time $T_N$ are copied to the dynamic volume 75. The changed blocks that are copied are the blocks of the file 73 in the snapshot ($T_N$) that have changed since the time $T_{N-1}$ of the previous snapshot 85 of the source volume 62. These changed blocks are identified by the modified block bitmap 86 of the previous snapshot 85. If the file 73 is sparse, then the changed blocks may include blocks that were allocated in the previous snapshot 85 at the time $T_{N-1}$ and are free in the snapshot 64 at the time $T_N$ (as indicated by the free block map 69 of the snapshot 64). In this case such a free block would represent a value of zero. In general, a value of zero is not written to the dynamic volume 75 for either the case of a full backup or the case of an incremental backup because the dynamic volume 76 initially has all of its blocks free and the virtual mount driver 82 interprets free blocks of the dynamic volume 75 as having a value of zero.

The various embodiments disclosed herein may the Microsoft Corp. Volume Shadow Copy Service (VSS) for the volume snapshot copy facility 63, and may use patches to interface VSS with the backup application 81 so that VSS and the backup application may share access to the source volume 62 and the snapshot volumes 64, 65 without contention. The backup application 81 may also use the patches to maintain changed block bitmaps that are independent of the modified block bitmaps of the snapshot volumes 64, 65. The patches are applied to the original write handler of the VSS driver that is responsible for creating snapshots of the source volume.

For example, in order to track write operations upon the source volume 62, a patch is applied to the WINDOWS™ filter driver "volsnap.sys". The patch may be applied by invoking an application programming interface (API) to find the "volsnap.sys" filter driver by name, and then replacing an entry point in a dispatch table of the "volsnap.sys" filter driver to replace an original write handler of the "volsnap.sys" filter driver with an alternative write handler of the backup application 81. In a similar fashion, an original control handler of the "volsnap.sys" filter driver may be replaced with an alternative control handler of the backup application 81. In this case any I/O flowing through the volume stack will then invoke one of these alternative handlers, so that the alternative handlers can track the write operations and control signals in order to create the backups of the source volume 62.

The various embodiments disclosed herein may use random access memory buffers (36 in FIG. 1) for the transfer of the data blocks of the selected file from the source volume 62 and the in-progress snapshot volume 64 to the dynamic volume 74 when the dynamic volume 74 has been mounted. These random access memory buffers are shared among the backup application 81, the volume snapshot facility 63, and the virtual mount driver 82. For example, the backup application loads, in a memory buffer, the starting offset and length of each extent of the selected file 73 to be read from the source volume 62 or the in-progress snapshot volume 64. The data blocks of the extents are then read from the source volume 62 or the in-progress snapshot volume 64 and stored and consolidated in a memory buffer. Then the virtual mount driver 82 writes the data blocks from the memory buffer into the mounted dynamic volume 75. Request and acknowledgement signals are exchanged between the backup application and the volume snapshot facility 63, and between the backup application and the virtual mount driver 82, to signal the beginning and completion of the data transfers to and from the memory buffer.

Figure 5:
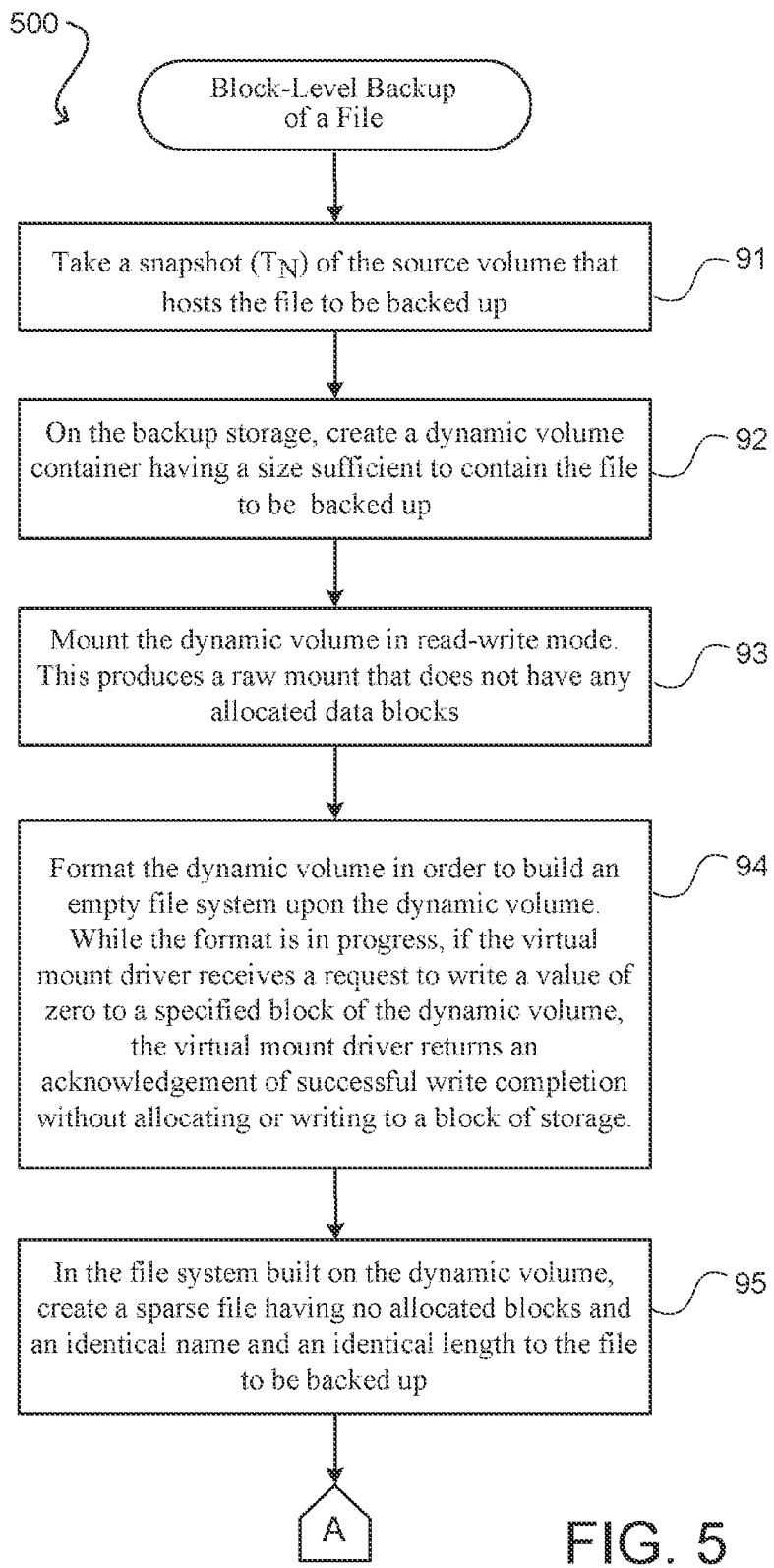
FIGS. 5 and 6 together show the procedure of the backup application introduced in FIG. 4.
Figure 6:
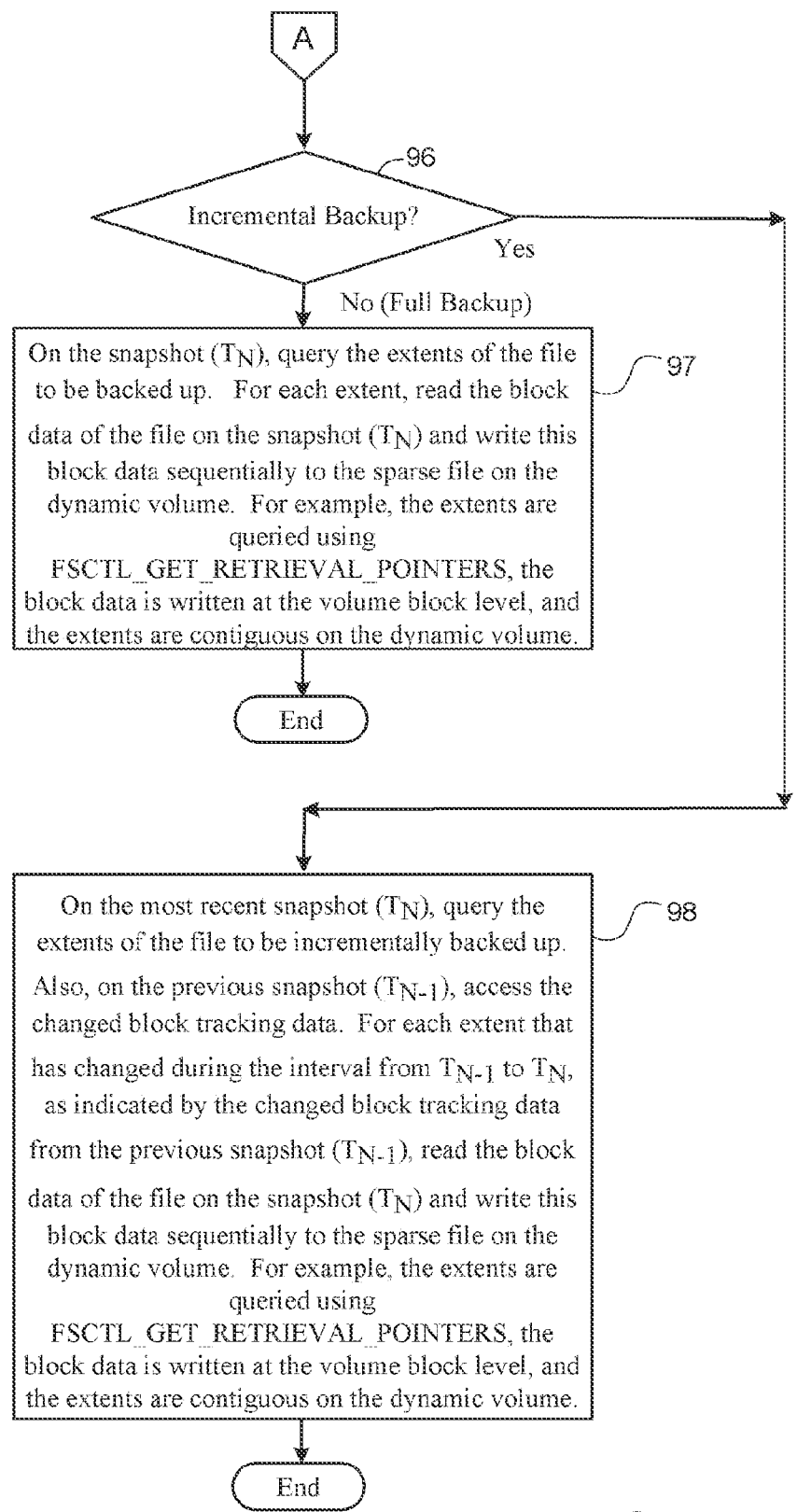

FIGS. 5 and 6 together show the procedure of the backup application 81 introduced in FIG. 4. In a first block 91 in FIG. 5, the volume snapshot copy facility is invoked to take a snapshot ($T_N$) of the source volume that hosts the file to be backed up. Next, in block 92, on the backup storage, a dynamic volume container is created. The dynamic volume container has a size sufficient to contain a selected file to be backed up. Then, in block 93, the dynamic volume is mounted in read-write mode. This produces a raw mount that does not have any allocated data blocks. Execution continues to block 94.

In block 94, the dynamic volume is formatted in order to build an empty file system upon the dynamic volume. While the format is in progress, if the virtual mount driver receives a request to write a value of zero to a specified block of the dynamic volume, the virtual mount driver returns an acknowledgement of successful write completion without allocating or writing to a block of storage. Execution continues to block 95.

In block 95, in the file system built on the dynamic volume, a sparse file is created having no allocated blocks and an identical name and an identical length to the file to be backed up. Execution continues to block 96 in FIG. 6.

In block 96, execution continues to block 97 to produce a full backup on the dynamic volume. In block 97, on the snapshot ($T_N$), the extents of the file to be backed up are queried. For each extent, the block data of the file is read from the snapshot ($T_N$), and this block data is written sequentially to the sparse file on the dynamic volume. For example, the extents are queried using FSCTL_GET_RETRIEVAL_POINTERS, the block data is written at the volume block level, and the extents are contiguous on the dynamic volume. Therefore the extents of the selected file are consolidated while the extents are copied at the block level from the snapshot copy of the source volume to the backup file on the backup volume. After block 97, the full backup of the selected file is finished.

In block 96, execution continues to block 98 to produce an incremental backup on the dynamic volume. In block 98, on the most recent snapshot ($T_N$), the extents of the file to be backed up are queried. Also, on the previous snapshot ($T_{N-1}$), the changed block bitmap is accessed. For each extent that has changed during the interval from $T_{N-1}$ to $T_N$, as indicated by the changed block bitmap from the previous snapshot ($T_{N-1}$), the block data of the file is read from the snapshot ($T_N$), and this block data is written sequentially to the sparse file on the dynamic volume. For example, the extents are queried using FSCTL_GET_RETRIEVAL_POINTERS, the block data is written at the volume block level, and the extents are contiguous on the dynamic volume. Therefore the extents of the selected file are consolidated while the extents are copied at the block level from the snapshot copy of the source volume to the backup file on the backup volume. After block 97, the incremental backup of the selected file is finished.

In the example of FIGS. 6 and 7, a single file was selected for backup in the dynamic container. A similar procedure is used for backing up multiple selected files on a dynamic volume container. In this case, the dynamic volume container created in block 92 has a size sufficient to contain the multiple selected files, and block 95 and block 97 or block 98 are repeated for each of the multiple selected files.

Another alternative for backup of multiple files is for the multiple files to be included in a single container file on the source volume, and to select this single container file for copying to the dynamic volume on the backup volume. For example, the single container file contains all of the files of a user's virtual machine in a virtualization environment on a shared computer, or all of the archive e-mail files of a particular user on an e-mail server.

Although the backup and recovery operations have been described above with respect to a network server (21 in FIG. 1), the backup and recovery operations can be performed in other general purpose or specialized computing devices, such as personal computers, desktop or laptop computers, or mainframe computers, as well as cellular, wireless, and handheld devices running mobile software and capable of supporting a number of networking and messaging protocols. The backup and recovery operations can be performed in a system including any number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, FTP, SFTP, UPnP, NFS and CIFS. The network can be, for example, a local area network, a wide-area network, a virtual private network, the Internet, an intranet, an extranet, a public switched telephone network, an infrared network, a wireless network, and any combination thereof.

In embodiments where the computing device includes a Web server, the Web server can run any of a variety of server or mid-tier applications, including HTTP servers, FTP servers, CGI servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer implemented method for performing block-level backup of a selected file on a source volume, the method comprising:
    (a) taking a snapshot copy of the source volume;
    (b) creating, mounting, and formatting a dynamically-extended backup volume;
    (c) creating a sparse backup file on the backup volume;
    (d) backing up the selected file comprising copying the extents of the selected file at the block level from the snapshot copy of the source volume to the backup file on the backup volume; and
    (e) consolidating extents of the selected file during the copying.

2. The computer implemented method of claim 1, wherein the block-level backup of the selected file is an incremental backup, (d) further includes finding changed blocks of the selected file by inspecting a modified block map of a previous snapshot copy of the source volume, and copying extents of only the changed blocks of the selected file from the snapshot copy of the source volume to the backup file on the backup volume.

3. The computer implemented method of claim 1, wherein the dynamically-extended backup volume is the logical extent of a sparse container file.

4. The computer implemented method of claim 1, wherein the dynamically-extended backup volume is contained in a container file that is compliant with a Microsoft Virtual Hard Disk Image Specification.

5. The computer implemented method of claim 1, wherein (c) includes giving the backup file a name identical to a name of the selected file, and giving the backup file a logical extent length identical to a logical extent length of the selected file.

6. The computer implemented method of claim 1, wherein (d) further includes invoking a file system manager to provide retrieval pointers for the extents of the selected file in the snapshot copy of the source volume, and using the retrieval pointers to fetch blocks of the extents of the selected file at the block level from the snapshot copy of the source volume, and writing the blocks of the extents of the file at the block level to the dynamically-extended backup volume.

7. The computer implemented method of claim 1, further comprising the backup volume, in response to a write request to write predetermined data to the volume backup, declining to execute the write request and responding and responding that the write request has been executed.

8. A computing system, comprising:
    at least one processor; and
    memory including instructions that, when executed by the at least one processor, cause the computing system to perform block-level backup of a selected file on a source volume by:
    (a) taking a snapshot copy of the source volume;

(b) creating, mounting, and formatting a dynamically-extended backup volume;
(c) creating a sparse backup file on the backup volume;
(d) backing up the selected file comprising copying the extents of the selected file at the block level from the snapshot copy of the source volume to the backup file on the backup volume; and
(e) consolidating extents of the selected file during the copying.

9. The computing system of claim 8, wherein the block-level backup of the selected file is an incremental backup, (d) further includes finding changed blocks of the selected file by inspecting a modified block map of a previous snapshot copy of the source volume, and copying extents of only the changed blocks of the selected file from the snapshot copy of the source volume to the backup file on the backup volume.

10. The computing system of claim 8, wherein the dynamically-extended backup volume is the logical extent of a sparse container file.

11. The computing system of claim 8, wherein the dynamically-extended backup volume is contained in a container file that is compliant with a Microsoft Virtual Hard Disk Image Specification.

12. The computing system of claim 8, wherein (c) includes giving the backup file a name identical to a name of the selected file, and giving the backup file a logical extent length identical to a logical extent length of the selected file.

13. The computing system of claim 8, wherein (d) further includes invoking a file system manager to provide retrieval pointers for the extents of the selected file in the snapshot copy of the source volume, and using the retrieval pointers to fetch blocks of the extents of the selected file at the block level from the snapshot copy of the source volume, and writing the blocks of the extents of the file at the block level to the dynamically-extended backup volume.

14. The computing system of claim 8, wherein the memory includes instructions to have the backup volume, in response to a write request to write predetermined data to the volume backup, declining to execute the write request and responding and responding that the write request has been executed.

15. A non-transitory computer readable storage medium storing one or more sequences of instructions executed by one or more processors to cause the one or more processors to perform block-level backup of a selected file on a source volume by:
(a) taking a snapshot copy of the source volume;
(b) creating, mounting, and formatting a dynamically-extended backup volume;
(c) creating a sparse backup file on the backup volume 3;
(d) backing up the selected file comprising copying the extents of the selected file at the block level from the snapshot copy of the source volume to the backup file on the backup volume; and
(e) consolidating extents of the selected file during the copying.

16. The non-transitory computer readable storage medium of claim 15, wherein the block-level backup of the selected file is an incremental backup, (d) further includes finding changed blocks of the selected file by inspecting a modified block map of a previous snapshot copy of the source volume, and copying extents of only the changed blocks of the selected file from the snapshot copy of the source volume to the backup file on the backup volume.

17. The non-transitory computer readable storage medium of claim 15, wherein the dynamically-extended backup volume is the logical extent of a sparse container file.

18. The non-transitory computer readable storage medium of claim 15, wherein the dynamically-extended backup volume is contained in a container file that is compliant with a Microsoft Virtual Hard Disk Image Specification.

19. The non-transitory computer readable storage medium of claim 15, wherein (c) includes giving the backup file a name identical to a name of the selected file, and giving the backup file a logical extent length identical to a logical extent length of the selected file.

20. The non-transitory computer readable storage medium of claim 15, wherein (d) further includes invoking a file system manager to provide retrieval pointers for the extents of the selected file in the snapshot copy of the source volume, and using the retrieval pointers to fetch blocks of the extents of the selected file at the block level from the snapshot copy of the source volume, and writing the blocks of the extents of the file at the block level to the dynamically-extended backup volume.

* * * * *